United States Patent

Fegen

[15] 3,688,635

[45] Sept. 5, 1972

[54] CIRCUIT BOARD SUPPORT

[72] Inventor: James Fegen, Chicago, Ill. 60646

[73] Assignee: Richco Plastic Company, Chicago, Ill.

[22] Filed: March 4, 1971

[21] Appl. No.: 120,830

[52] U.S. Cl. .............85/5 R, 24/73 PF, 317/101 CC, 339/17 R, 339/128

[51] Int. Cl. ...........................F16b 19/00, H02b 1/02

[58] Field of Search ...............85/5 R, 80, DIG. 2, 14; 24/73 PM, 73 PF, 73 HS, 208 A, 213 R; 339/128, 17 R, 17 LM, 125 R; 52/703; 317/101 CC, 101 CM, 101 D, 101 DH; 248/361, 216

[56] References Cited

UNITED STATES PATENTS

| | | | |
|---|---|---|---|
| 2,442,754 | 6/1948 | Beam | 24/208 A UX |
| 3,029,486 | 4/1962 | Raymond | 24/73 HS |
| 3,136,591 | 6/1964 | Just et al. | 339/17 LM |
| 3,220,078 | 11/1965 | Preziosi | 85/5 R X |
| 3,364,805 | 1/1968 | Sandford | 85/13 |

FOREIGN PATENTS OR APPLICATIONS

| | | | |
|---|---|---|---|
| 1,122,395 | 8/1968 | Great Britain | 85/5 R |

*Primary Examiner*—Ramon S. Britts
*Attorney*—Martin Faier

[57] ABSTRACT

A circuit board support of one piece dielectric insulating plastic material having locking means for securing the support to a chassis and a resilient coupling for removably securing and supporting a circuit board spaced apart from the chassis, the locking means and coupling being adequately versatile to accept chassis and circuit board thicknesses of varying dimensions.

9 Claims, 5 Drawing Figures

INVENTOR.
JAMES FEGEN
BY
MARTIN FAIER
ATTORNEY

CIRCUIT BOARD SUPPORT

This invention relates to supports for mounting components in electrical and electronic equipment, and is more particularly directed to a circuit board support of plastic dielectric insulating material one one-piece construction, which may be used for removably securing and supporting a printed circuit board on a chassis.

The device which embodies the present invention comprises a rigid support member, having at its lower end a flexible member for locking the support in upright position on a chassis and on its upper end a resilient coupling for removably securing and supporting a circuit board elevated above the chassis. The device disclosed herein is sufficiently versatile to accommodate a variety of chassis and circuit board thicknesses.

It is therefore an object of the present invention to provide a circuit board support of one piece construction, which is easy to manufacture and simple to use without installation hardware or tools.

Another object of the invention is to provide a circuit board support which will flexibly lock onto a chassis in upright position, and which will support a circuit board elevated over the chassis, but which will permit the circuit board to be easily removed for replacement or repair.

Other objects and advantages of the present invention will become apparent from this description, the accompanying drawings, and the appended claims. In the drawings:

Figure 1:
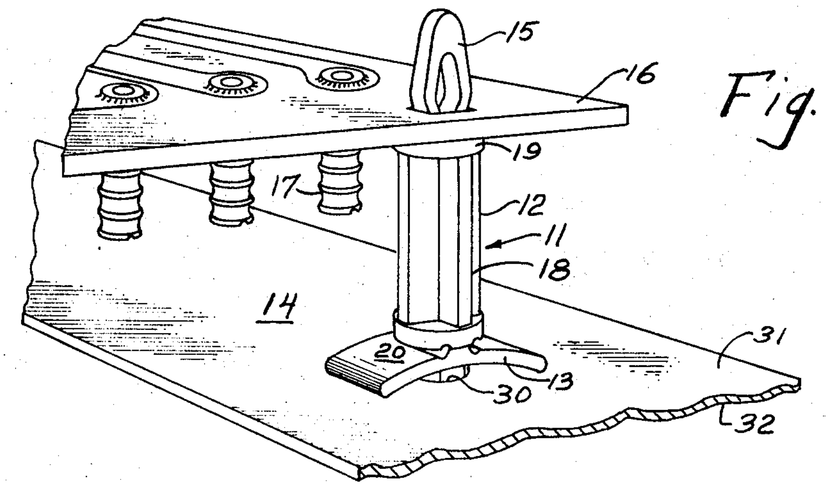
FIG. 1 is a perspective view of one embodiment of the invention, mounted on a chassis and supporting a circuit board.
Figure 2:
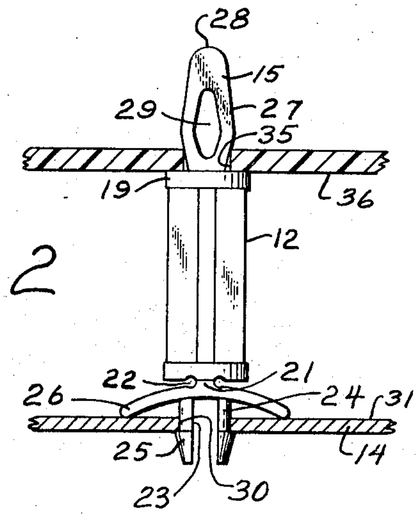
FIG. 2 is a side elevation of a circuit board support, showing the circuit board and chassis in section.
Figure 3:
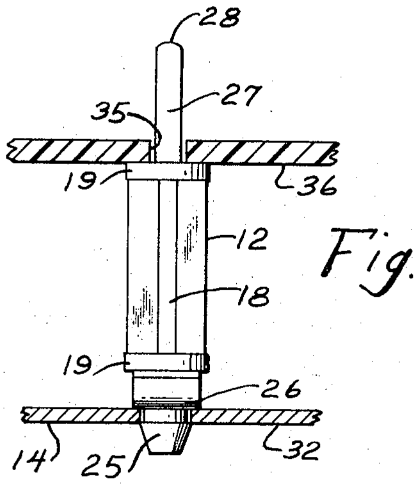
FIG. 3 is another side elevation view of the support shown in FIG. 2.
Figure 4:
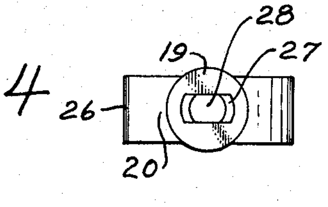
FIG. 4 is a top plan view of the support shown in FIG. 2.
Figure 5:
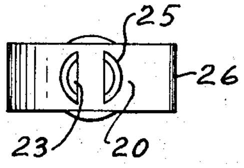
FIG. 5 is a bottom plan view of the support shown in FIG. 2.

The support 11 comprises an upright shaft 12, having at its lower end a flexible locking member 13 for securing the support in an upright position on a chassis 14, and on its upper end a resilient coupling 15 for removably securing and supporting a circuit board 16 having electrical components 17 suspended therefrom in elevated position above the chassis.

The shaft 12 preferably has reinforcing ribs 18 and an upper and lower collar 19 for maintaining the shaft in rigid upstanding position, particularly under load of the circuit board 16 and during assembly of the board onto the supports.

The locking member 13 has a base 20, joined to the shaft by a web 21 and having flexure grooves 22 on either side thereof, and a prong 23, comprising stem portions 24 and barb portions 25, extending from the base. Opposed free ends 26 of base 20 are arched toward the barbs 25.

At the upper end of the shaft 12, remote from the locking member 13, is a coupling 15 for securing the circuit board thereon. This coupling has side walls 27 which are tapered outwardly from the shaft and then inwardly toward its upper end 28 to define a diamond shaped aperture 29 thru the coupling.

In use, the circuit board components are preferably first assembled thereon. The locking member 13 is press fit into an aperture 30 preformed in the chassis 14, so that the free ends 26 of the base 20 bear against the upper surface 31 of the chassis and the barbs 25 snap-lock against the lower surface 32 of the chassis. The mounting may accommodate chassis of various thickness because the free ends of the base are flexible.

The assembled circuit board 16 has a suitable aperture 35 preformed therethrough, and the coupling 15 is press fit through the circuit board aperture so that the lower surface 36 of the board rests upon the upper collar 19 of the shaft 12. The side walls 27 are yieldable into the diamond shaped aperture 29 to permit snap retention of the board onto the support and to allow the support to accommodate boards of minor thickness and aperture variations. Removal of the board from the coupling for repair or replacement of the circuit or components is easily accomplished by forcing the coupling 15 back through the aperture 35.

The circuit board support disclosed in this application is preferably injection molded in one piece from nylon, although other moldable resilient materials having dielectric insulating properties may be utilized.

While I have illustrated and described a preferred embodiment of my invention, it is apparent that various changes and modifications in the details of the structure may be made without departing from the spirit or scope of the invention. Accordingly, I do not desire to be limited to the exact construction described and illustrated.

I claim:

1. A one piece support of plastic dielectric insulating material for mounting a circuit board on a chassis, said support comprising, an upstanding shaft, external ribs on said shaft co-extensive with the length of said shaft, a collar on each end of said shaft into which said ribs merge, a base integral with the collar at the lower end of said shaft and being resiliently yieldable in an axial direction, a bifurcated locking member integral with the base and extending outwardly therefrom, and a resiliently yieldable coupling integral with the collar at the upper end of said shaft.

2. The support recited in claim 1, in which the base has its opposed free ends arched in the direction of the locking member.

3. The support recited in claim 1, in which the base is substantially rectangular and has its opposed longitudinal ends arched in the direction of the locking member.

4. The support recited in claim 1, in which a thin web is interposed between the base and the related collar.

5. The support recited in claim 1, in which the bifurcated locking member comprises two stem portions.

6. The support recited in claim 5, in which each stem portion has a barb on its free end.

7. The support recited in claim 1, in which the circuit board is apertured and the coupling comprises spaced apart yieldable walls for engagement in said aperture.

8. The support recited in claim 7, in which said walls are tapered toward and away from one another to define a coupling normally slightly wider than the circuit board aperture.

9. A one piece support of plastic dielectric insulating material for mounting a circuit board on an apertured chassis, said support comprising a rigid reinforced upstanding shaft, a base integral with the shaft at the lower end thereof and being resiliently yieldable in an axial direction, a locking member integral with the base and extending therefrom through the chassis aperture, and coupling means for securing said circuit board to the support, said base having opposed free ends arched in the direction of the locking member adaptable to rest on the upper surface of the chassis and said locking member having barbs adaptable to resiliently engage the undersurface of the chassis for yieldable securement of the support in an upstanding position on the chassis.

* * * * *